(12) United States Patent
Gui et al.

(10) Patent No.: US 9,474,425 B2
(45) Date of Patent: Oct. 25, 2016

(54) DUST COLLECTOR FOR CLEANER AND CLEANER HAVING THE SAME

(71) Applicant: JIANGSU MIDEA CLEANING APPLIANCES CO., LTD., Jiangsu (CN)

(72) Inventors: Kang Gui, Jiangsu (CN); Qi Zhang, Jiangsu (CN)

(73) Assignee: Jiangsu Midea Cleaning Appliances Co., Ltd., Suzhou (CN)

( * ) Notice: Subject to any disclaimer, the term of this patent is extended or adjusted under 35 U.S.C. 154(b) by 0 days.

(21) Appl. No.: 14/852,920

(22) Filed: Sep. 14, 2015

(65) Prior Publication Data

US 2016/0000284 A1 Jan. 7, 2016

Related U.S. Application Data

(63) Continuation of application No. PCT/CN2014/075112, filed on Apr. 10, 2014.

(30) Foreign Application Priority Data

Apr. 11, 2013 (CN) .......................... 2013 2 0182436

(51) Int. Cl.
*B01D 50/00* (2006.01)
*A47L 9/16* (2006.01)
(Continued)

(52) U.S. Cl.
CPC ............ *A47L 9/1683* (2013.01); *A47L 9/1608* (2013.01); *A47L 9/1666* (2013.01); *A47L 9/1691* (2013.01);
(Continued)

(58) Field of Classification Search
CPC .... B01D 45/16; B01D 50/002; B01D 45/12; B01D 46/2411; A47L 9/1608; A47L 9/1683
USPC ......... 55/337, 424, 426, 428, 429, 449, 447, 55/DIG. 3
See application file for complete search history.

(56) References Cited

U.S. PATENT DOCUMENTS 2,633,596 A 4/1953 Turner et al.
5,093,956 A 3/1992 Saunders et al.
(Continued)

FOREIGN PATENT DOCUMENTS

CN 1947641 A 4/2007
CN 1954764 A 4/2007
(Continued)

OTHER PUBLICATIONS

PCT/CN2014/075272 English translation of the International Search Report mailed Jan. 28, 2015, 2 pages.
(Continued)

*Primary Examiner* — Dung H Bui
(74) *Attorney, Agent, or Firm* — Lathrop & Gage LLP

(57) ABSTRACT

A dust collector for a cleaner and a cleaner are provided. The dust collector includes a dust-collection container (10) defining an inner chamber therein and having a dust-laden air inlet (101) and an air outlet (102); a filter (30) disposed in the dust-collection container (10) and having a filtering cup (32) and a flange (31), the flange (31) being connected with an inner wall of the dust-collection container (10) to divide the inner chamber into a first chamber (103) and a second chamber (104); and a cyclone barrel (20) disposed in the second chamber (104) and having an air inlet (201), an open upper end (202) and a closed lower end (203), a lower end of the filtering cup (32) being extended into the cyclone barrel (20) through the open upper end (202), the open upper end (202) being spaced apart from a lower surface (311) of the flange (31).

17 Claims, 5 Drawing Sheets

(51) Int. Cl.
*B01D 45/16* (2006.01)
*B01D 45/12* (2006.01)
*B01D 46/24* (2006.01)

(52) U.S. Cl.
CPC ............... *B01D 45/12* (2013.01); *B01D 45/16* (2013.01); *B01D 50/002* (2013.01); *B01D 46/2411* (2013.01)

(56) References Cited

U.S. PATENT DOCUMENTS

| | | | | |
|---|---|---|---|---|
| 7,114,216 B2* | 10/2006 | Stephens | ................ | A47L 5/28 15/326 |
| 7,422,615 B2* | 9/2008 | Kim | .................. | A47L 9/1608 55/426 |
| 7,708,791 B2* | 5/2010 | Oh | ..................... | A47L 9/1625 15/353 |
| 7,749,294 B2* | 7/2010 | Oh | ..................... | A47L 5/28 15/319 |
| 7,770,256 B1* | 8/2010 | Fester | ................ | A47L 9/1641 15/353 |
| 7,776,116 B2* | 8/2010 | Oh | ..................... | A47L 9/0081 55/345 |
| 7,780,752 B2* | 8/2010 | Cha | .................... | A47L 9/122 55/288 |
| 7,785,381 B2* | 8/2010 | Oh | ..................... | A47L 9/108 15/347 |
| 7,803,205 B2* | 9/2010 | Oh | ..................... | A47L 9/122 55/337 |
| 7,883,560 B2* | 2/2011 | Ni | ..................... | A47L 9/1625 15/352 |
| 8,252,096 B2* | 8/2012 | Horne | .................. | A47L 9/10 55/DIG. 3 |
| 2002/0129461 A1 | 9/2002 | Wegelin | .............. | A47L 5/34 15/359 |
| 2004/0154126 A1* | 8/2004 | Hansen | ............... | A47L 9/1666 15/353 |
| 2004/0231305 A1* | 11/2004 | Oh | ..................... | A47L 9/1625 55/345 |
| 2005/0066469 A1* | 3/2005 | Oh | ..................... | A47L 9/165 15/353 |
| 2005/0166560 A1* | 8/2005 | Takemoto | ............ | A47L 9/102 55/482 |
| 2006/0213161 A1* | 9/2006 | Archambault | ......... | A47L 5/38 55/467 |
| 2006/0254226 A1* | 11/2006 | Jeon | .................. | A47L 9/1625 55/345 |
| 2007/0144116 A1* | 6/2007 | Hong | ................. | A47L 9/0081 55/345 |
| 2008/0190080 A1* | 8/2008 | Oh | ..................... | A47L 9/1625 55/343 |
| 2008/0264007 A1* | 10/2008 | Oh | ..................... | A47L 9/108 55/304 |
| 2008/0295466 A1* | 12/2008 | Cha | ................... | A47L 9/122 55/296 |
| 2010/0132316 A1* | 6/2010 | Ni | ..................... | A47L 9/1625 55/343 |
| 2010/0154367 A1* | 6/2010 | Luo | ................... | A47L 5/362 55/337 |
| 2010/0229328 A1* | 9/2010 | Conrad | ............... | A47L 5/24 15/344 |
| 2011/0219574 A1* | 9/2011 | Conrad | ............... | A47L 9/1683 15/347 |
| 2011/0219581 A1 | 9/2011 | Vines et al. | | |
| 2011/0314629 A1 | 12/2011 | Conrad | | |
| 2012/0284955 A1* | 11/2012 | Han | ................... | A47L 5/362 15/353 |
| 2013/0091660 A1* | 4/2013 | Smith | ................ | A47L 9/165 15/353 |
| 2015/0289737 A1* | 10/2015 | Riru | .................. | A47L 9/165 55/419 |

FOREIGN PATENT DOCUMENTS

| | | |
|---|---|---|
| CN | 101108105 A | 1/2008 |
| CN | 101108106 A | 1/2008 |
| CN | 101411603 A | 4/2009 |
| CN | 101437596 A | 5/2009 |
| CN | 201333002 Y | 10/2009 |
| CN | 101658405 A | 3/2010 |
| CN | 101721174 A | 6/2010 |
| CN | 101756675 A | 6/2010 |
| CN | 102334954 | 2/2012 |
| CN | 202821202 U | 3/2013 |
| CN | 203341657 U | 12/2013 |
| CN | 203841620 U | 9/2014 |
| JP | 2003180584 A | 7/2003 |
| JP | 2010119623 A | 3/2010 |
| WO | 2011112289 A2 | 9/2011 |

OTHER PUBLICATIONS

PCT/CN2014/075274 English translation of the International Search Report mailed Feb. 4, 2015, 2 pages.
PCT/CN2014/075112 English translation of the International Search Report & Written Opinion mailed Jul. 16, 2014, 13 pages.
U.S. Appl. No. 14/851,926 Non Final Office Action dated Nov. 16, 2015, 11 pages.
U.S. Appl. No. 14/852,953 Non-Final Office Action dated Dec. 2, 2015, 10 pages.
U.S. Appl. No. 14/853,129 Non Final Office Action dated Nov. 16, 2015, 14 pages.

* cited by examiner

DUST COLLECTOR FOR CLEANER AND CLEANER HAVING THE SAME

CROSS REFERENCE TO RELATED APPLICATION

This application is a continuation of International Patent Application No. PCT/CN2014/075112, filed Apr. 10, 2014, which claims the benefit of priority of Chinese Patent Application No. 201320182436.8, filed with the State Intellectual Property Office on Apr. 11, 2013. Each of the above-mentioned applications is incorporated herein by reference in its entirety.

FIELD

Embodiments of the present disclosure generally relate to the field of household appliance, more particularly, to a dust collector for a cleaner and a cleaner having the same.

BACKGROUND

A dust collector for a cleaner in the related art includes a dust-collection container, a cyclone barrel in the dust-collection container and a filter in the cyclone barrel. A dust discharging port is formed in the cyclone barrel. When dust-laden air is sucked into the cyclone barrel along a tangent direction of the cyclone barrel through a dust-laden air inlet of the dust-collection container, the dust particles with a high density are thrown onto an inner wall of the cyclone barrel under a centrifugal force and discharged into the dust-collection container via the dust discharging port of the cyclone barrel, such that the dust particles can be collected in the dust-collection container. Furthermore, after the centrifugal filtration, the clean air contract and is collected towards a center of the cyclone barrel to generate a secondary vortex, such that the clean air can be drawn out from the filter.

However, inclusions with a light weight and a large size, such as a facial tissue, cannot be discharged through the dust discharging port of the cyclone barrel (i.e. the inclusions are stuck in the dust discharging port) after the inclusions enter into the dust collector. Thus, the filter in the cyclone barrel may be blocked, so as to greatly influence the separating performance of the cyclone barrel.

SUMMARY

Embodiments of the present disclosure seek to solve at least one of the problems existing in the related art to at least some extent.

Accordingly, an embodiment of the present disclosure is to provide a dust collector with a great dust collection effect.

Another embodiment of the present disclosure is to provide a cleaner including the dust collector.

A dust collector according to embodiments of the present disclosure includes a dust-collection container defining an inner chamber therein and having a dust-laden air inlet and an air outlet; a filter disposed in the dust-collection container and having a filtering cup and a flange disposed on an upper end of the filtering cup, the flange being connected with an inner wall of the dust-collection container so as to divide the inner chamber into a first chamber communicating with the air outlet and a second chamber; a cyclone barrel disposed in the second chamber and having an air inlet communicating with the dust-laden air inlet, the cyclone barrel having an open upper end and a closed lower end, a lower end of the filtering cup being extended into the cyclone barrel through the open upper end of the cyclone barrel, and the open upper end of cyclone barrel being spaced apart from a lower surface of the flange.

With the dust collector according to embodiments of the present disclosure, the open upper end of cyclone barrel is spaced apart from a lower surface of the flange. Thus, the inclusions is facilitated to be separated from the dust-laden air entering into the dust collector, and the inclusions separated from the duet-laden air can be collected in the dust-collection container via a gap D formed between the upper end of cyclone barrel and the lower surface of the flange.

Because of the gap D, the inclusion, such as facial tissue, can pass through the gap D between the upper end of the cyclone barrel and the lower surface of the flange and be collected in the dust-collection container, thus avoiding blocking of the cyclone barrel, and the reliability of the dust collector is improved. Moreover, the dust collector has a simplified structure and a low maintaining cost.

In some embodiments, the air inlet is connected with the dust-laden air inlet via a dust-laden air tube.

In some embodiments, the air inlet is formed in a side wall of the cyclone barrel and the dust-laden air inlet is formed in a side wall of the dust-collection container.

In some embodiments, a distance between the lower surface of the flange and the upper end of the cyclone barrel ranges from 10 mm to 35 mm, thus improving a dust-collection capacity of the dust collector and facilitating application of the dust collector. In addition, the dust collector is easily to assemble, and the assembling efficiency of the dust collector is improved.

In some embodiments, the dust-collection container includes a body having an open upper end and a cover detachably coupled to the body to close the upper end of the body, and the air outlet is formed in the cover. Therefore, the dust-collection container has a simple structure and it is easy to mold the dust-collection container and mount the cyclone barrel, thus reducing the manufacturing cost of the dust collector and improving the assembling efficiency.

In some embodiments, the flange is mounted on an inner wall of the body and adjacent to the upper end of the body.

In some embodiments, an annular groove is formed in an outer periphery surface of the flange, and a plurality of notches is formed in an upper wall of the annular groove and spaced from one another in a circumferential direction of the flange. A plurality of positioning bosses is disposed on the inner wall of the body, adjacent to the upper end of the body, and adapted to fit within the annular groove via the plurality of notches respectively.

In some embodiments, a plurality of second air holes is formed in at least one of a side wall and a bottom wall of the body, thus facilitating an air cycle in the dust-collection container and improving the dust-collection capacity.

In some embodiments, a plurality of first air holes is formed in a wall of the dust-laden air tube, thus further facilitating the air cycle in the dust-collection container.

In some embodiments, the cyclone barrel is mounted onto the body via screws. Therefore, it is easy to assemble and disassemble the dust-collection container and the cyclone barrel, thus not only improving the assembling efficiency of the dust collector, but also facilitating maintenance of the dust collector, thus reducing the maintenance cost.

In some embodiments, the cyclone barrel and the body are formed integrally. Therefore, the dust collector has a simple structure and is easy to be molded. Further, it is easy to seal the dust collector, thus not only improving the sealing effect of the dust collector, but also reducing the manufacturing cost of the dust collector.

In some embodiments, a rib is disposed on at least one of a side wall and a bottom wall of the second chamber. The rib can hinder the dust-laden air circulated in the dust-collection container, and accumulate the dust at the lower end of the dust-collection container quickly, thus further improving the dust collection effect of the dust collector.

In some embodiments, a plurality of ribs is arranged in a circumferential direction of the dust-collection container, thus further improving the hindering effect on the air circulated in the dust-collection container by the rib.

According to embodiments of the present disclosure, a cleaner is provided, including the dust collector according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
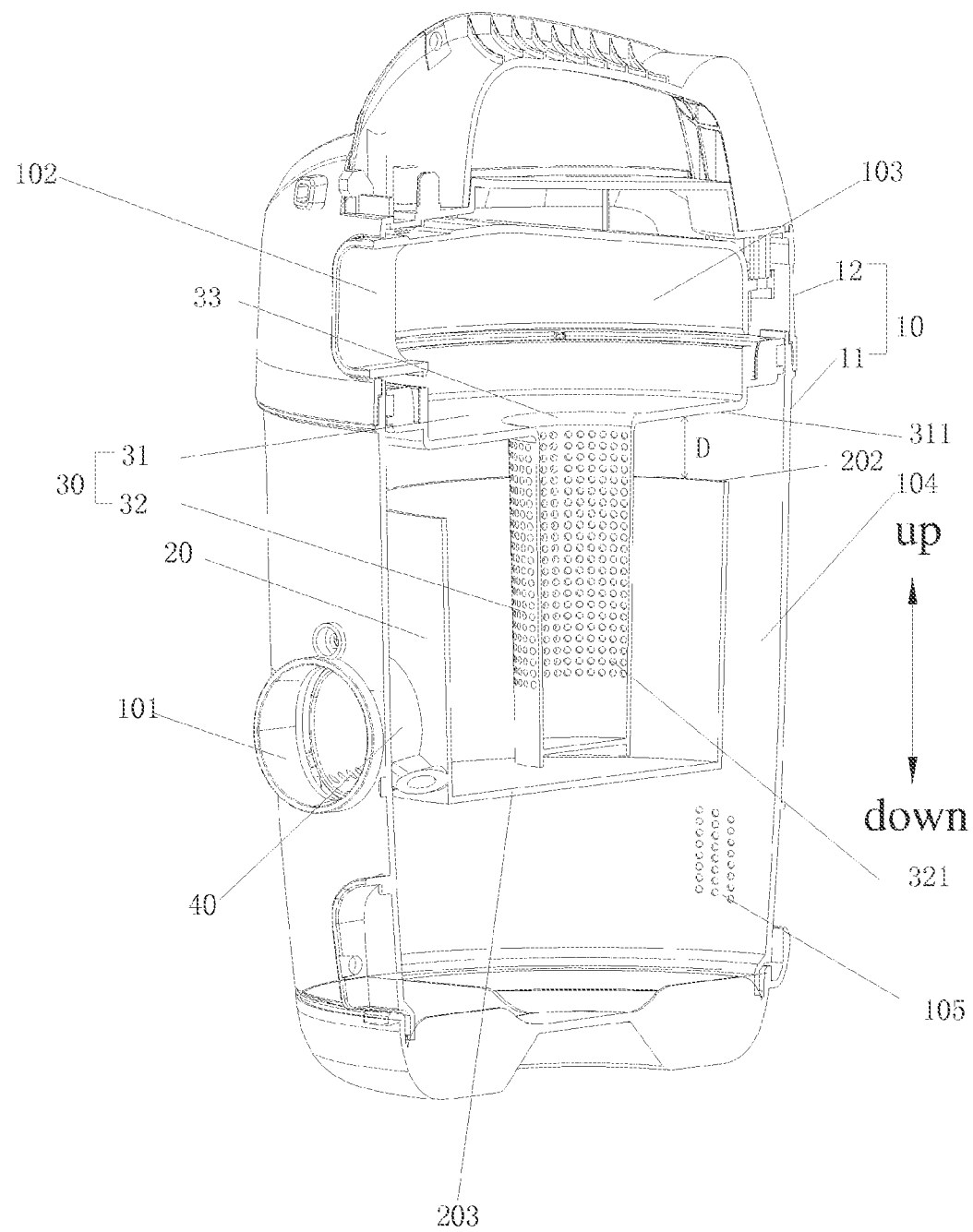
FIG. 1 is a sectional view of a dust collector for a cleaner according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" ,"inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

A dust collector for a cleaner in the related art includes a dust-collection container, a cyclone barrel in the dust-collection container and a filter in the cyclone barrel. A dust discharging port is formed in the cyclone barrel. When dust-laden air is sucked into the cyclone barrel along a tangent direction of the cyclone barrel through a dust-laden air inlet of the dust-collection container, the dust particles with a high density are thrown onto an inner wall of the cyclone barrel under a centrifugal force and discharged into the dust-collection container via the dust discharging port of the cyclone barrel, such that the dust particles can be collected in the dust-collection container. Furthermore, after the centrifugal filtration, the clean air is collected towards a center of the cyclone barrel to generate a secondary vortex, such that the clean air can be drawn out from the filter.

However, inclusions with a light weight and a large size, such as a facial tissue, cannot be discharged through the dust discharging port of the cyclone barrel after the inclusions enter into the dust collector. Thus, the filter in the cyclone barrel may be blocked, so as to greatly influence the separating performance of the cyclone barrel.

Accordingly, a dust collector with great dust collection performance according to embodiments of the present disclosure is provided.

As shown in FIGS. 1-5, the dust collector for a cleaner according to embodiments of the present disclosure includes: a dust-collection container 10, a cyclone barrel 20 and a filter 30.

Specifically, as shown in FIG. 1, the dust-collection container 10 has an inner chamber therein, a dust-laden air inlet 101 and an air outlet 102. The dust-laden air is sucked into the dust-collection container 10 via the dust-laden air inlet 101, and then is discharged out via the air outlet 102 after being filtered in the dust collector. Furthermore, the dust-laden air inlet 101 is formed in a side wall of the dust-collection container 10.

The filter 30 is disposed in the dust-collection container 10, and has a filtering cup 32 and a flange 31 disposed on an upper end of the filtering cup 32. The flange 31 is connected with an inner wall of the dust-collection container 10 so as to divide the inner chamber into a first chamber 103 and a second chamber 104. The first chamber 103 communicates with the air outlet 102.

In addition, the cyclone barrel 20 is disposed in the second chamber 104 and used to separate dust from the dust-laden air in the dust collector. The cyclone barrel 20 has an air inlet 201 communicating with the dust-laden air inlet 101 via a dust-laden air tube 40, such that the clean air separated from dust-laden air by the filter 30 can pass through the second chamber 104 and the first chamber 103 in turn, and finally be discharged from the dust-collection container 10. Moreover, the air inlet 201 may be formed in a side wall of the cyclone barrel 20, and the barrel 20 has an open upper end 202 and a closed lower end 203.

In some embodiments, a lower end of the filtering cup 32 is extended into the cyclone barrel 20 through the open upper end 202 of the cyclone barrel 20, and the open upper end 202 of cyclone barrel 20 is spaced apart from a lower surface 311 of the flange 31, i.e., an annular gap D is form between the upper end 201 of the cyclone barrel 20 and a lower surface 311 of the flange 31.

The inclusion, such as facial tissue, can pass through the gap D between the upper end 201 of the cyclone barrel and the lower surface 311 of the flange 31 and be collected in the dust-collection container 10, so that the cyclone barrel 20 cannot be blocked and the reliability of the dust collector is improved. Moreover, the dust collector has a simplified structure and a low maintaining cost.

In some embodiments, a distance between the lower surface 311 of the flange 31 and the upper end 202 of the cyclone barrel 20 ranges from 10 mm to 35 mm, namely a height of the gap D ranges from 10 mm to 35 mm, thus improving the dust collecting performance of the dust collector. In addition, an assembling process of the dust collector is simplified and an assembling efficiency of the dust collector is improved.

Figure 2:
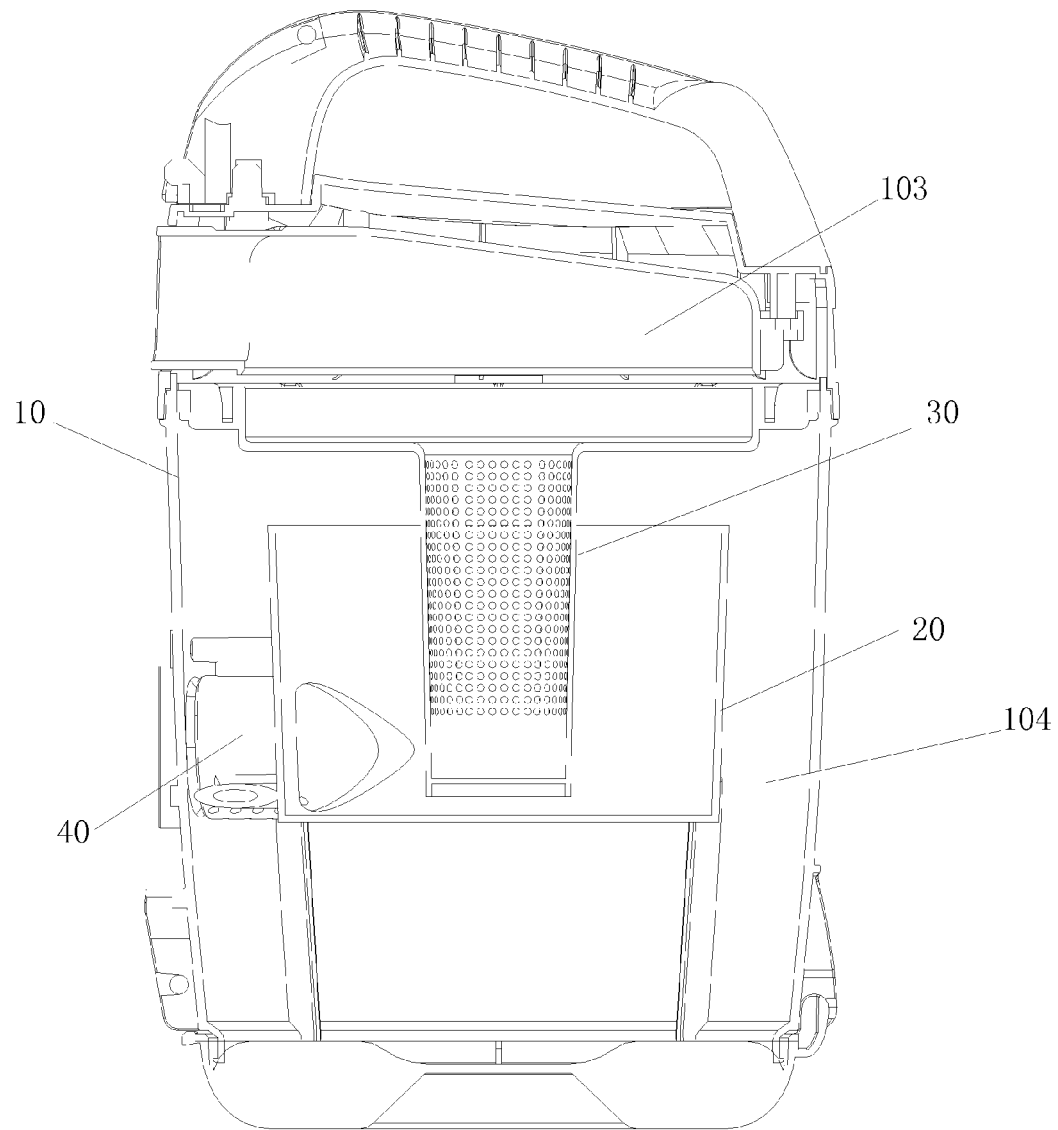
FIG. 2 is a schematic view of a dust collector for a cleaner according to an embodiment of the present disclosure.

In some embodiments, as shown in FIGS. 1 and 2, the dust-collection container 10 may include a body 11 and a cover 12. The body 11 has an open upper end and the cover 12 is detachably coupled to the body 11 to close the upper end of the body 11, and the air outlet 102 may be formed in the cover 12. Therefore, the detachable cover 12 can facilitate assembling cyclone barrel 20 in the dust-collection container 10, and structures of the body 11 and cover 12 reduce the difficulty and cost of manufacturing.

As shown in FIG. 1, the flange 31 is mounted on an inner wall of the body 11 and adjacent to the upper end of the body 11. The filtering cup 32 may be a cylinder with a plurality of filtering holes 321 formed in a periphery surface of cylinder. Furthermore, the upper end of the filtering cup 32 is connected with the lower surface 311 of the flange 31, and a filtering air outlet 33 is formed at a joint of the upper end of the filtering cup 32 and the lower surface 311 of the flange 31. The filtering air outlet 33 communicates with the air outlet 102 of the dust-collection container 10.

Figure 4:
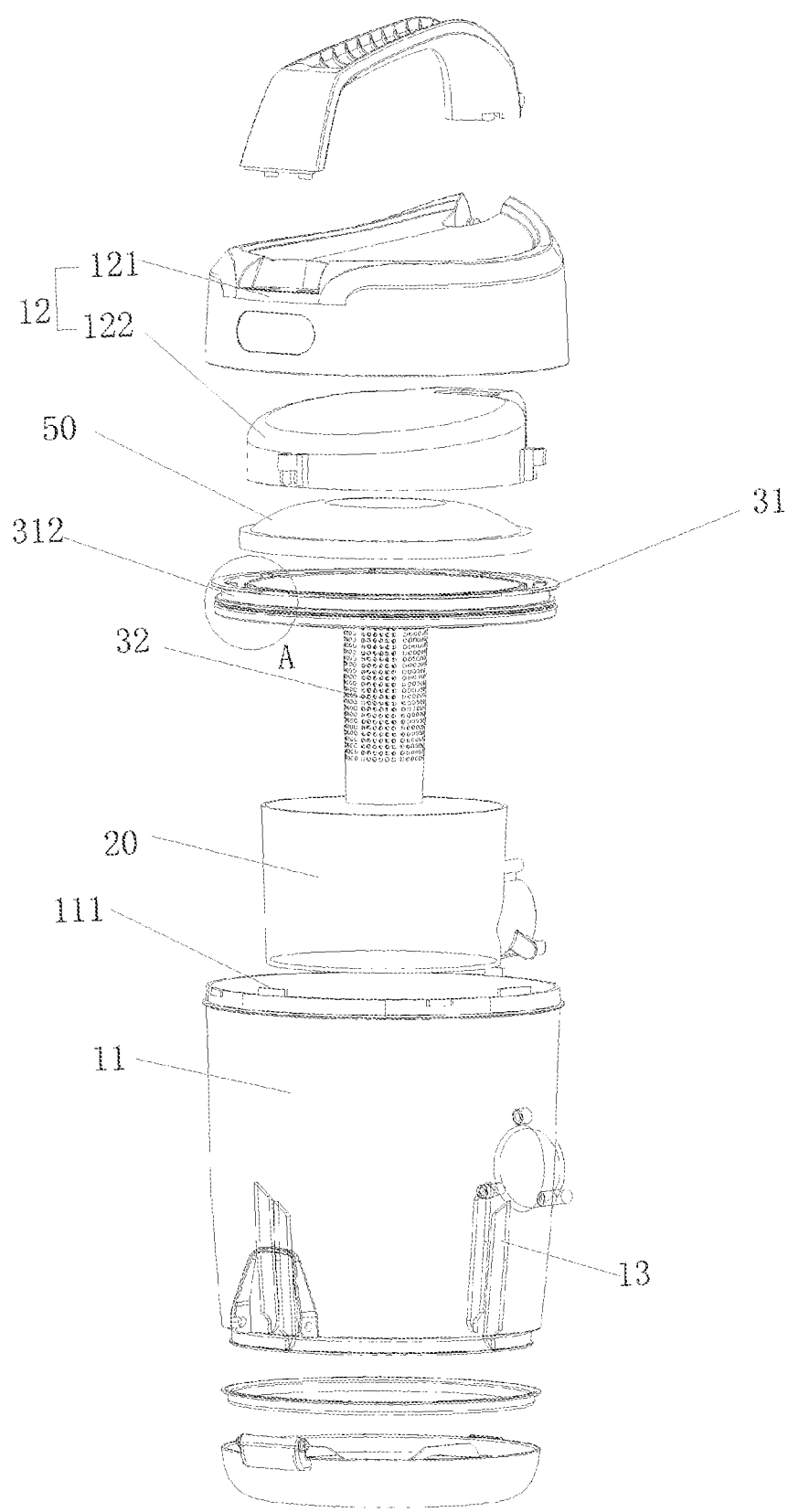
FIG. 4 is an exploded view showing a dust collector for a cleaner according to an embodiment of the present disclosure.
Figure 5:
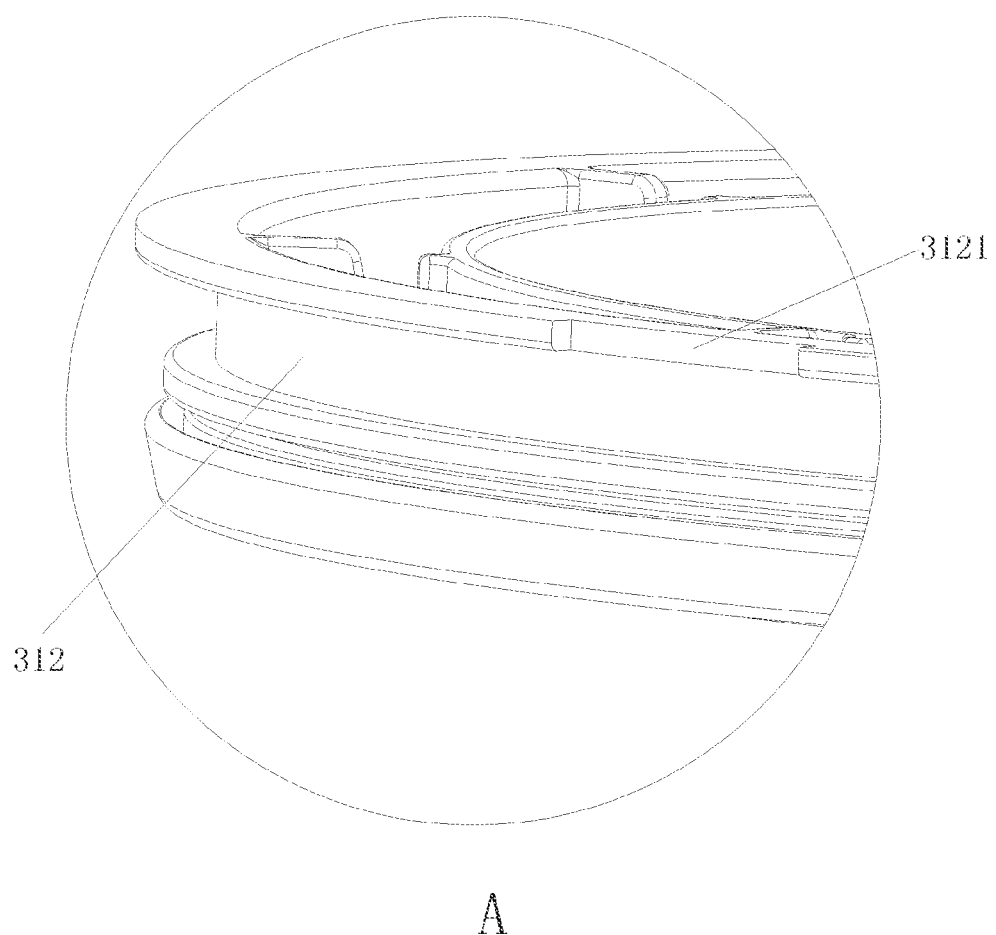
FIG. 5 is a partially enlarged view of a region A shown in FIG. 4.

In some embodiments, as shown in FIGS. 4 and 5, an annular groove 312 is formed in an outer periphery surface of the flange 31, and a plurality of notches 3121 is formed in an upper wall of the annular groove 312 and spaced from one another in a circumferential direction of the flange 31. Furthermore, a plurality of positioning bosses 111 is disposed on the inner wall of the body 11, adjacent to the upper end of the body 11, and adapted to fit within the annular groove 312 via the plurality of notches 3121 respectively.

After the bosses 111 fitting within the annular groove 312, the filter 30 is rotated to offset the bosses 111 and notches 3121 in the up-down direction, thus the connection of the flange 31 and the inner wall of the body 11 is completed, and the flange 31 will not be separated with the body 11 until the bosses 111 is aligned with the notches 3121 by rotating the filter 30 again. The first chamber 103 is formed by the flange 31 and the cover 12, and the second chamber 104 is formed by the flange 31 and the body 11.

In some embodiments, a plurality of second air holes 105 may be formed in a side wall of the body 11, thus facilitating an air cycle in the dust-collection container 10 and further improving the dust-collection performance. Alternately, the plurality of second air holes 105 may be formed in a bottom wall of the body 11, or in both the side wall and the bottom wall of the body 11.

Figure 3:
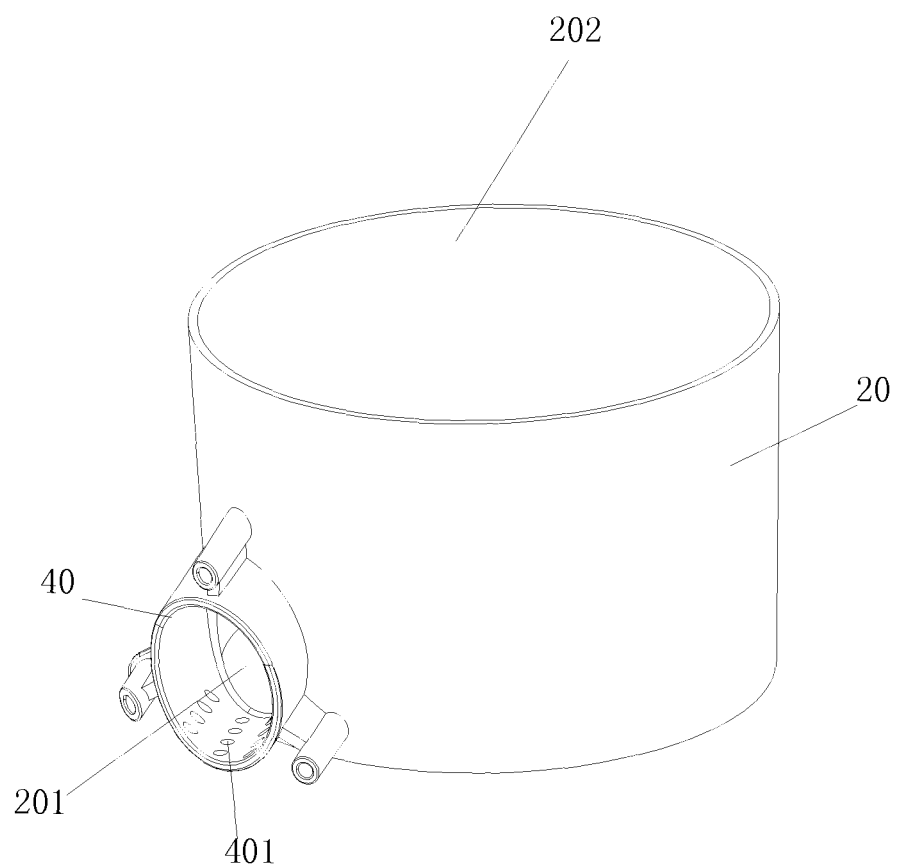
FIG. 3 is a schematic view showing a cyclone barrel of a dust collector for a cleaner according to an embodiment of the present disclosure.

As shown in FIG. 3, a plurality of first air holes 401 is formed in a wall of the dust-laden air tube 40, further facilitating the air cycle in the dust-collection container.

In some embodiments, the cyclone barrel 20 may be mounted onto the body 11 via screws. Therefore, it is easy to assemble and disassemble the dust-collection container 10 and the cyclone barrel 20, thus not only improving the assembling efficiency of the dust collector, but also facilitating maintenance of the dust collector, thus reducing the maintenance cost.

In addition, the cyclone barrel 20 and the body 11 may be formed integrally. Therefore, the dust collector is easy to be manufactured and assembled, thus not only improving the sealing effect of the dust collector, but also reducing the manufacturing cost of the dust collector.

In some embodiments, as shown in FIG. 4, a rib 13 is disposed on at least one of a side wall and a bottom wall of the second chamber 104. The rib 13 can accumulate the dust on the lower end of the dust-collection container 10 quickly, thus improving the dust collection effect of the dust collector.

In some embodiments, a plurality of ribs 13 is arranged in a circumferential direction of the dust-collection container 10.

As shown in FIG. 5, the plurality of ribs 13 such as four ribs is disposed on a lower part of the side wall of the dust-collection container 10, which is arranged in a circumferential direction of the dust-collection container 10. An end of the rib 13 is connected with the side wall of the dust-collection container 10, and the other end of the rib 13 is extended inward in the dust-collection container 10. In other words, the ribs 13 are connected with the side wall of the dust-collection container 10, and are extended toward a central axis of the dust-collection container 10.

Alternately, the rib 13 is connected with the side wall of the dust-collection container 10 and is perpendicular to the inner side wall of the dust-collection container 10. Therefore, the rib 13 disposed in the dust-collection container 10 and used to block the air circulated in the dust collector, thus facilitating the dust to be accumulated at the lower end of the dust-collection container 10 quickly and improving the dust collection efficiency of the dust collector.

In some embodiments, as shown in FIG. 4, the cover 12 includes an outer cover 121 and an inner cover 122, thus improving the sealing performance of the dust-collection container 10.

In addition, as shown in FIG. 5, the dust collector according to embodiments of the present disclosure further includes a filter cotton 50 and a sealing ring, in order to further improve sealing performance of the dust-collection container 10.

A cleaner according to embodiments of the present disclosure includes the dust collector as described in the above embodiments of the present disclosure.

With the dust collector according to embodiments of the present disclosure, the air and dust in the dust-laden air entering into the dust collector can be separated from each other and the dust can be collected by the dust-collection container 10.

Because of the gap D, the inclusion, such as facial tissue, can pass through the gap D between the upper end 201 of the cyclone barrel and the lower surface 311 of the flange 31 and be collected in the dust-collection container 10, so that the cyclone barrel 20 cannot be blocked and the reliability of the cleaner is improved. Moreover, the dust collector has a simplified structure and a low maintaining cost.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A dust collector for a cleaner, comprising:
    a dust-collection container (10) defining an inner chamber therein and having a dust-laden air inlet (101) and an air outlet (102);
    a filter (30) disposed in the dust-collection container (10) and having a filtering cup (32) and a flange (31) disposed on an upper end of the filtering cup (32), the flange (31) being connected with an inner wall of the dust-collection container (10) so as to divide the inner chamber into a first chamber (103) communicating with the air outlet (102) and a second chamber (104);
    a cyclone barrel (20) disposed in the second chamber (104) and having an air inlet (201) communicating with the dust-laden air inlet (101), the cyclone barrel (20) having an open upper end (202) and a closed lower end (203), a lower end of the filtering cup (32) being extended into the cyclone barrel (20) through the open upper end (202) of the cyclone barrel (20), and the open upper end (202) of cyclone barrel (20) being spaced apart from a lower surface (311) of the flange (31),
    wherein the air inlet (201) is connected with the dust-laden air inlet (101) via a dust-laden air tube (40), and a plurality of first air holes (401) is formed in a wall of the dust-laden air tube (40).

2. The dust collector according to claim 1, wherein the air inlet (201) is formed in a side wall of the cyclone barrel (20) and the dust-laden air inlet (101) is formed in a side wall of the dust-collection container (10).

3. The dust collector according to claim 1, wherein a distance between the lower surface (311) of the flange (31) and the upper end (202) of the cyclone barrel (20) ranges from 10mm to 35mm.

4. The dust collector according to claim 1, wherein a filtering air outlet (33) is formed at a joint of the upper end of the filtering cup (32) and the lower surface (311) of the flange (31) and communicates with the air outlet (102) of the dust-collection container (10).

5. The dust collector according to claim 1, wherein a rib (13) is disposed on at least one of a side wall and a bottom wall of the second chamber (104).

6. The dust collector according to claim 5, wherein a plurality of ribs (13) is arranged in a circumferential direction of the dust-collection container (10).

7. The dust collector according to claim 1, wherein the dust-collection container (10) comprises a body (11) having an open upper end and a cover (12) detachably coupled to the body to close the upper end of the body (11), and the air outlet (102) is formed in the cover (12).

8. The dust collector according to claim 7, wherein the flange (31) is mounted on an inner wall of the body (11) and adjacent to the upper end of the body (11).

9. The dust collector according to claim 8, wherein an annular groove (312) is formed in an outer periphery surface of the flange (31), and a plurality of notches (3121) is formed in an upper wall of the annular groove (312) and spaced from one another in a circumferential direction of the flange (31),
    wherein a plurality of positioning bosses (111) is disposed on the inner wall of the body (11), adjacent to the upper end of the body (11), and adapted to fit within the annular groove (312) via the plurality of notches (3121) respectively.

10. The dust collector according to claim 7, wherein a plurality of second air holes (105) is formed in at least one of a side wall and a bottom wall of the body (11).

11. The dust collector according to claim 7, wherein the cyclone barrel (20) is mounted onto the body (11) via screws.

12. The dust collector according to claim 7, wherein the cyclone barrel (20) and the body (11) are formed integrally.

13. A cleaner, comprising the dust collector for a cleaner according to claim 1.

14. The cleaner according to claim 13, wherein the air inlet (201) is formed in a side wall of the cyclone barrel (20) and the dust-laden air inlet (101) is formed in a side wall of the dust-collection container (10).

15. The cleaner according to claim 13, wherein a distance between the lower surface (311) of the flange (31) and the upper end (202) of the cyclone barrel (20) ranges from 10 mm to 35 mm.

16. The cleaner according to claim 13, wherein the dust-collection container (10) comprises a body (11) having an open upper end and a cover (12) detachably coupled to the body to close the upper end of the body (11), and the air outlet (102) is formed in the cover (12).

17. The cleaner according to claim 16, wherein the flange (31) is mounted on an inner wall of the body (11) and adjacent to the upper end of the body (11), an annular groove (312) is formed in an outer periphery surface of the flange (31), and a plurality of notches (3121) is formed in an upper wall of the annular groove (312) and spaced from one another in a circumferential direction of the flange (31), wherein a plurality of positioning bosses (111) is disposed on the inner wall of the body (11), adjacent to the upper end of the body (11), and adapted to fit within the annular groove (312) via the plurality of notches (3121) respectively.

* * * * *